United States Patent [19]
Lindsey et al.

[11] 3,918,685
[45] Nov. 11, 1975

[54] CONVERTIBLE CONDUCTOR STRINGING ASSEMBLY FOR POWER LINE USE

[75] Inventors: L. E. Lindsey, Pasadena; Herbert F. Sammons, Glendale, both of Calif.

[73] Assignee: Lindsey Manufacturing Company, Pasadena, Calif.

[22] Filed: Nov. 23, 1973

[21] Appl. No.: 418,475

Related U.S. Application Data

[60] Division of Ser. No. 259,315, June 2, 1972, Pat. No. 3,822,862, which is a continuation of Ser. No. 55,056, July 15, 1970, abandoned.

[52] U.S. Cl. .......... 254/134.3 PA; 254/195; 174/172
[51] Int. Cl.² ........................................... B65H 59/00
[58] Field of Search ........ 254/190 R, 191, 192, 194, 254/195, 196, 134.3 PA; 174/172, 173; 24/68, 284, 276; 294/31.2

[56] References Cited
UNITED STATES PATENTS

| | | | |
|---|---|---|---|
| 1,002,761 | 9/1911 | Salmini | 24/276 |
| 1,453,173 | 4/1923 | Pairard | 174/172 |
| 1,992,073 | 2/1935 | Hempel | 174/172 |
| 2,116,957 | 5/1938 | Barnes | 174/172 |
| 2,202,184 | 5/1940 | Berger | 254/195 |
| 2,235,102 | 3/1941 | Fleener | 174/172 |
| 2,613,256 | 10/1952 | Thomas | 254/134.3 PA |
| 2,772,857 | 12/1956 | Bush | 254/195 |
| 3,235,228 | 2/1966 | Lindsey | 254/134.3 PA |
| 3,545,724 | 12/1970 | Wright | 254/134.3 PA |

FOREIGN PATENTS OR APPLICATIONS

613,543   11/1926   France ............................ 254/195

*Primary Examiner*—Frank E. Werner
*Assistant Examiner*—Kenneth Noland
*Attorney, Agent, or Firm*—Sellers and Brace

[57] ABSTRACT

Convertible conductor stringing assembly for use when installing a power conductor along a power line and usable in a variety of modes to accommodate different conditions. The conductor handling sheave is clampable against one side of the insulator itself and in an appropriate position such that the stringing block sheave is pivotable from one of its several normal stringing positions to a position for transfer of the conductor directly into clamping position on the insulator. The stringing block mounting assembly readily accommodates a range of insulator sizes on which the pivoting sheave subassembly is securable in a number of positions.

6 Claims, 10 Drawing Figures

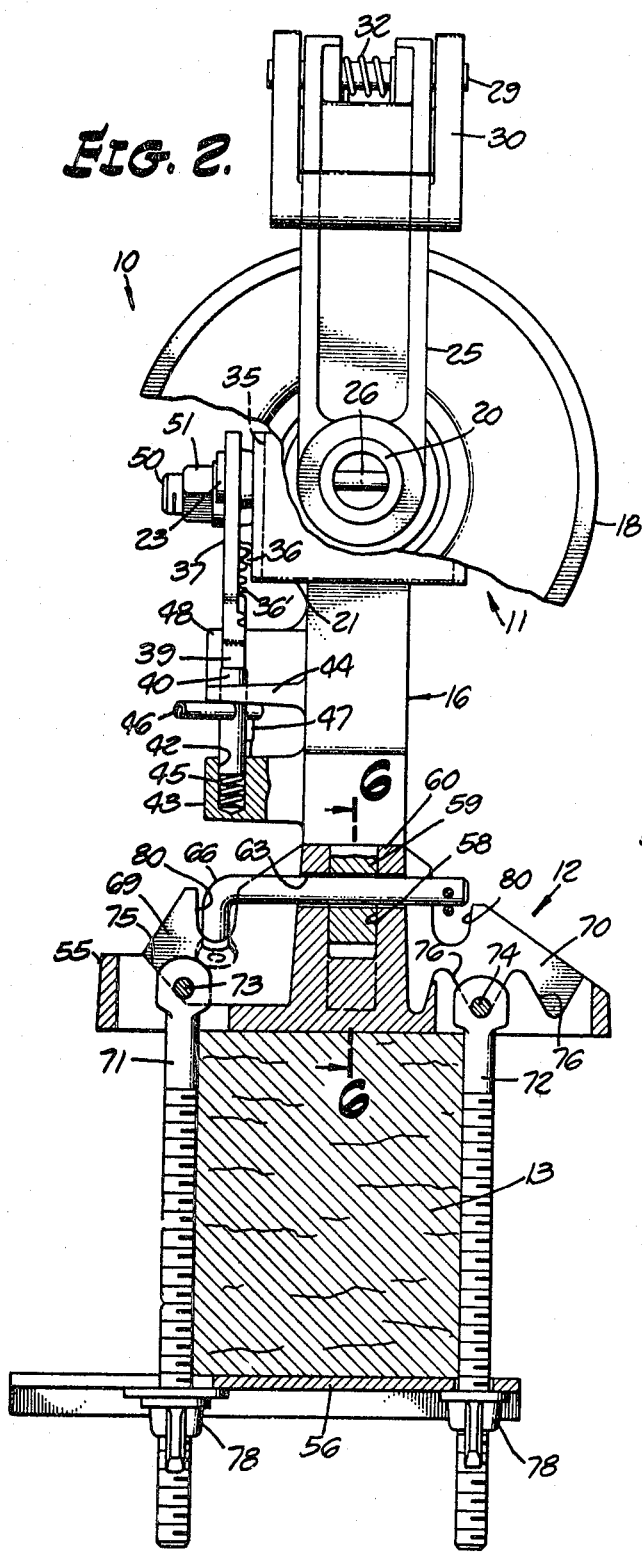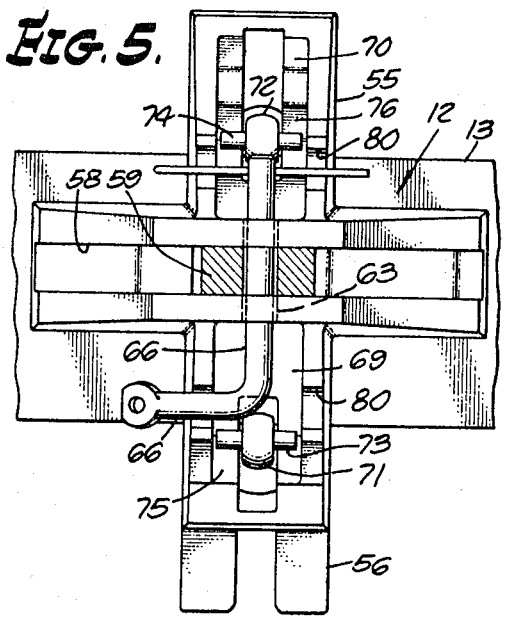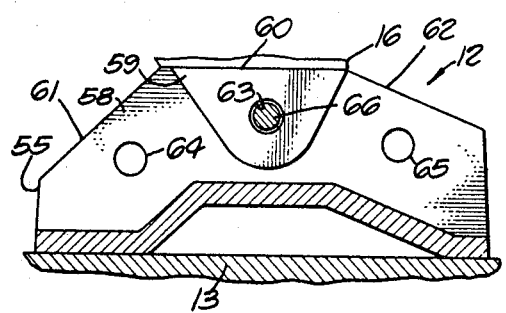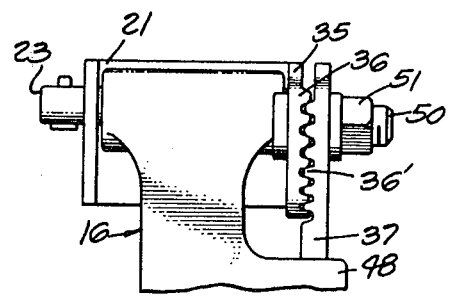

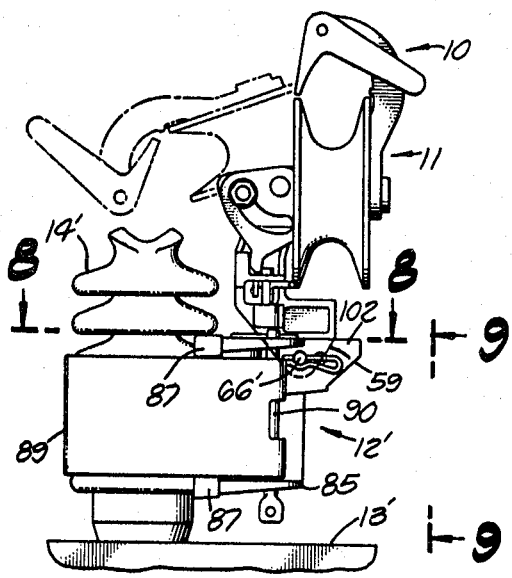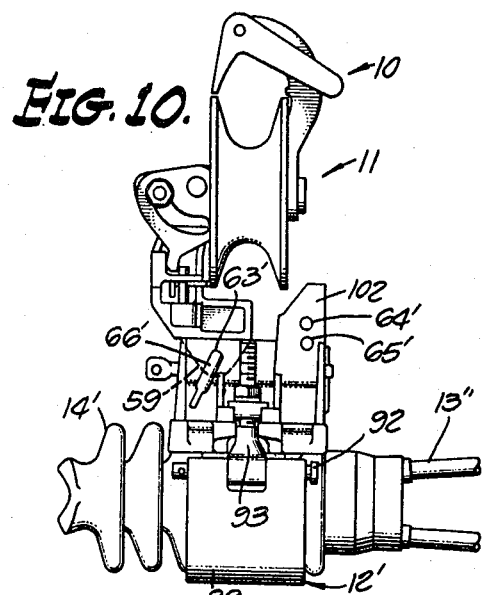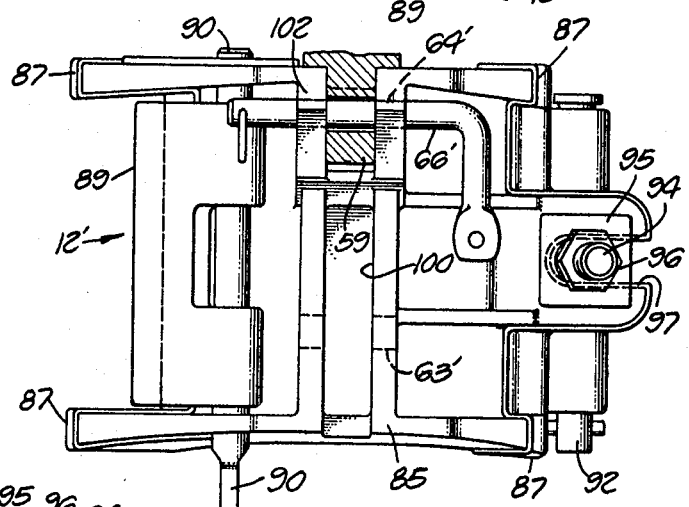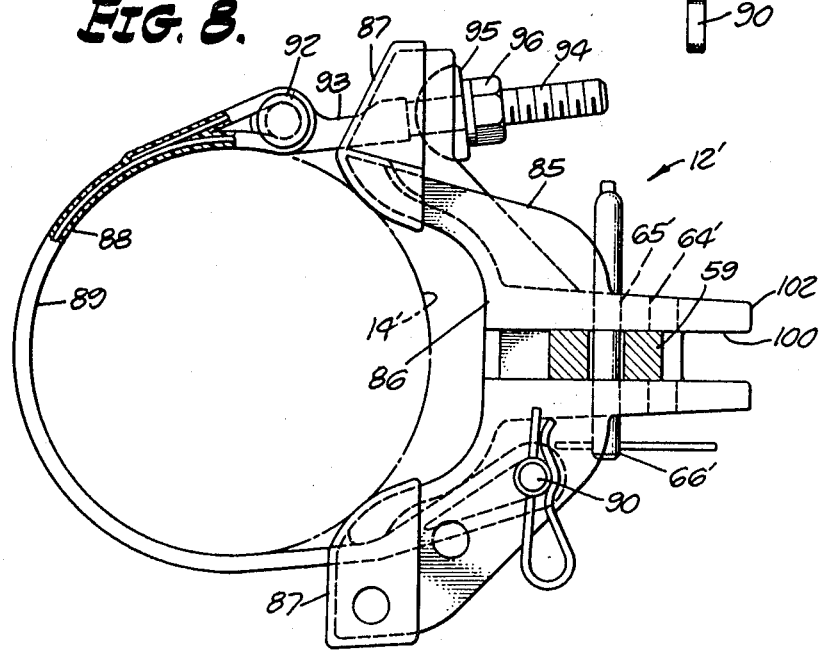

CONVERTIBLE CONDUCTOR STRINGING ASSEMBLY FOR POWER LINE USE

This application is a division of our copending application for U.S. letters patent Ser. No. 259,315, filed June 2, 1972 now U.S. Pat. No. 3,822,862 issued July 9, 1974 which application is a continuation of our application for U.S. Letters Patent, Ser. No. 55,056, filed July 15, 1970 now abandoned.

This invention relates to conductor stringing devices, and more particularly to a unique conductor stringing assembly readily convertible for use while secured directly to a power line insulator or alternatively while secured to a cross arm supporting the insulator.

Modern power line designs are undergoing rapid change owing to many factors including improvements in construction materials, new and greatly improved components, and the ability of equipment to handle ever higher voltages. These and the like factors introduce new problems as respects equipment employed to install conductors, and particularly as respects stringing accessories employed temporarily at each insulator while pulling the conductor into place along the power line and thereafter to transfer the conductor onto the insulator.

Owing to the great variety of modes of supporting the insulator and changes in the insulator sizes and designs, power companies have found that hardware purchased for use on one power line is quite unsuitable for use on a different line and under different conditions. For example, if the conductor stringing sheave of prior equipment is designed for support on the cross arm for a particular size insulator then it is quite unsuitable for use with an insulator of substantially different size. Alternatively if the prior stringing sheave is designed for use beside an upright insulator it is unusable to install a conductor on a horizontally supported insulator or on one inclined to the vertical.

In view of the foregoing and other numerous shortcomings of prior conductor stringing equipment, it is the purpose of the present invention to provide a unique and highly versatile convertible conductor stringing assembly usable in a greaty variety of ways in connection with insulators varying widely in diameter, height and relationship to the horizontal plane as well as on different size cross arms. To this end the invention construction comprises a sheave sub-assembly having a mounting shank selectively securable in a variety of positions in either of two types of supports, one of which is clampable about the body of the insulator itself, and the other of which is clampable to the insulator support cross arm. The sheave sub-assembly is provided with a multi-position hinging connection between the sheave proper and its supporting shank normally locked in a selected position. After the conductor has been hauled into its operating position the hinging connection is unlocked to permit lateral pivoting of the sheave to dump the conductor onto the insulator.

The stringing assembly is clampable with equal facility to an insulator supported horizontally, vertically or at any intermediate inclination. The alternate mounting clamp for the stringing sheave has simple but versatile means for rigidly clamping the same to a cross arm. This clamp is so designed that it is securable with equal rigidity to cross arms of widely varying size and tolerance variations, including both the vertical and horizontal thicknesses of the cross arms.

Accordingly it is a primary object of the present invention to provide a unique, convertible, conductor stringing assembly mountable directly on and along one side of the body of the insulator proper.

Another object of the invention is the provision of a convertible conductor stringing assembly comprising an insulator clamping sub-assembly securable about the length thereof and adapted to support the sheave sub-assembly selectively in an appropriate position to string a conductor and thereafter transfer the conductor onto the conductor seat on the outer end of that same insulator.

Another object of the invention is the provision of an improved conductor stringing sub-assembly having a sheave pivotally secured to one end of the mounting arm having its other end equipped with a mounting shank selectively securable in various positions on a support therefor which support is temporarily anchorable to the midlength of an insulator for the conductor to be strung.

Another object of the invention is the provision of a conductor stringing sub-assembly mountable beside an insulator with the plane of the sheave normal or at some selected inclination parallel to the insulator axis, and having its stringing sheave pivotable between a normal conductor stringing position and a second position convenient for the transfer of the conductor from the sheave onto the insulator.

Another object of the invention is the provision of novel support means for a conductor stringing sub-assembly which is clampable about the body of an insulator and usable to support the stringing sub-assembly in an upright stringing position either beside or normal to the insulator.

These and other more specific objects will appear upon reading the following specification and claims and upon considering in connection therewith the attached drawing to which they relate.

Referring now to the drawing in which a preferred embodiment of the invention is illustrated:

FIG. 2 is a vertical cross sectional view taken generally along broken line 2—2 on FIG. 1;

FIG. 5 is a fragmentary view taken along line 5—5 on FIG. 1;

FIG. 6 is a fragmentary view taken along line 6—6 on FIG. 2;

FIG. 7 is an elevational view generally similar to FIG. 1 but showing the stringing sub-assembly supported along the side of a longer upright insulator and employing a mounting band support encircling the body of the insulator;

FIG. 8 is a cross sectional view on an enlarged scale taken along line 8—8 on FIG. 7;

FIG. 9 is a fragmentary view on an enlarged scale and partly in cross section taken along line 9—9 on FIG. 7; and FIG. 10 is a view similar to FIG. 7 but showing the stringing assembly in its normal operating position when clamped to the body of the horizontally supported insulator.

Figure 1:
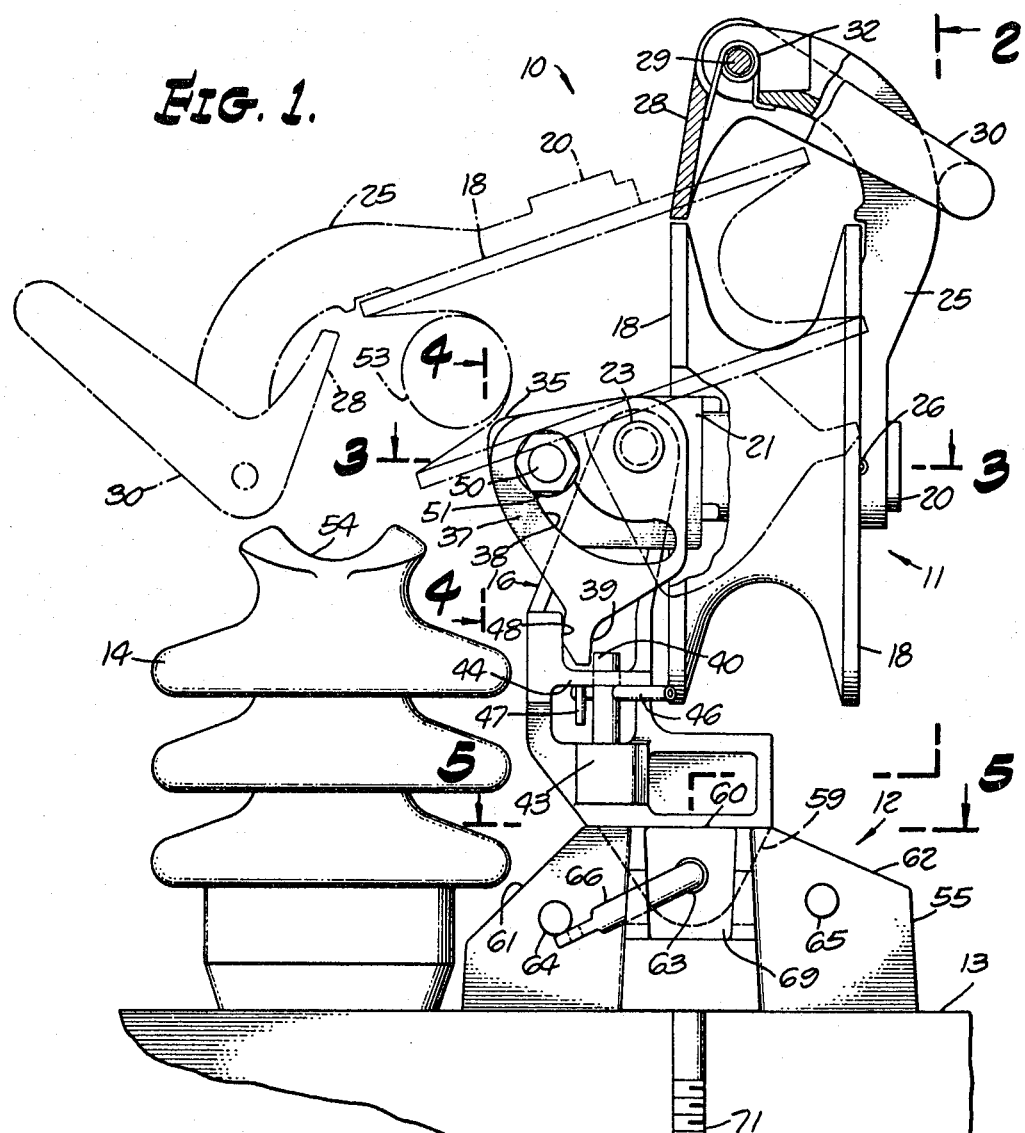
FIG. 1 is a vertical side view of the invention convertible conductor stringing assembly secured to a cross arm closely beside an upright insulator and including a dotted line showing of the sheave pivoted to a position to transfer the conductor onto an insulator.

Referring initially more particularly to FIGS. 1–6, there is shown an illustrative embodiment of the convertible stringing assembly, designated generally 10, comprising a sheave sub-assembly 11 rigidly clamped in a cross arm mounting sub-assembly 12. The latter sub-assembly 12 is shown secured to a typical cross arm 13 beside an upright insulator 14 mounted on the cross arm.

The sheave sub-assembly 11 has an elongated rigid main body 16 cast from suitable material such as high strength lightweight alloy. Deeply grooved sheave 18 is provided with anti-friction bearings 19 (FIG. 3) and is supported on a sub-shaft 20 having a bifurcated head 21 at one end hingedly connected by hinge pin 23 to the upper end of the main body 16.

Sheave 18 is secured in place on shaft 20 by a radial arm 25 held telescoped over the outer end of the shaft by a keeper pin 26. The upper curved end of arm 25 overlies the sheave groove and pivotally supports a keeper 28 by means of a pivot pin 29. Guard 28 is generally L-shaped and its longer leg 30 is provided with a large opening to receive the upper end of arm 25. The conductor guard is held normally in the position shown in FIG. 1 by a torsion spring 32, the outer transverse end of its leg 30 engaging the outer edge of arm 25. Further clockwise rotation of the guard is therefore prevented and the conductor seated on the sheave is held positively captive until the guard is manually rotated counterclockwise to the position indicated in dot and dash lines in FIG. 1.

Figure 3:
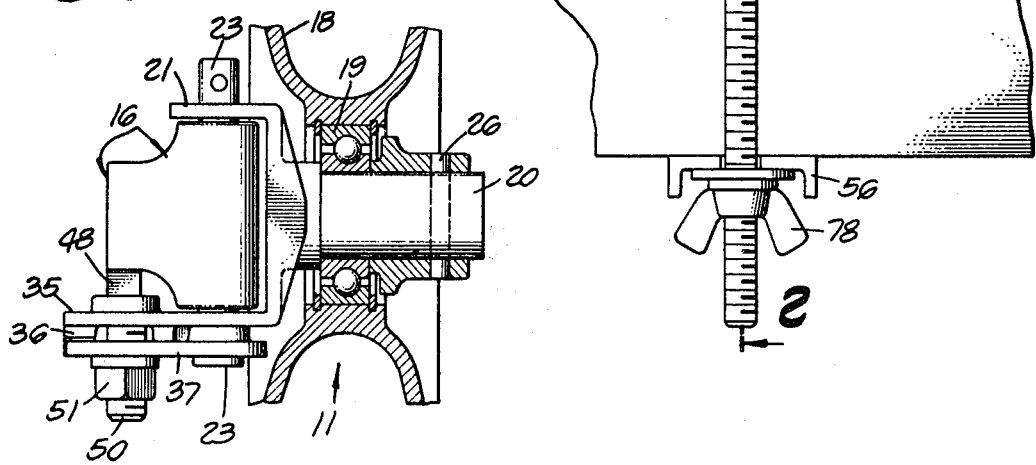
FIG. 3 is a fragmentary cross sectional view taken generally along line 3—3 on FIG. 1; a FIG. 4 is a fragmentary view taken along line 4—4 on FIG. 1.

Referring now more particularly to FIGS. 1–4, the means for selectively locking sheave 18 in a desired angular position relative to its main supporting body 16 will be described. One arm 35 of the bifurcated end 21 of the sheave supporting shaft is longer than the other as is best shown in FIG. 3 and its exterior surface is provided with an arcuate row of teeth 36 which interlock with teeth 36' on the adjacent face of a sector 37 fixed to the hinge pin 23. This sector is provided with an arcuate slot 38 desirably having a length of at least 90°. Protruding downwardly from the periphery of sector 37 is a locking lug 39 rotatable past the end of a latching pin 40 (FIGS. 1, 2). Latching pin 40 is supported for axial reciprocation within a well 42 of a boss 43 integral with main body 16, and an opening through a second boss 44 of the main casting and is normally urged to its latching position by a compression spring 45 housed in well 42. An operating handle 46 for the latch pin is normally held against the underside of boss 44 by spring 45. The inner end of handle 46 protrudes into the path of a stop pin 47 anchored in boss 44 as is evident from FIG. 1. A lug 48 cooperates with the upper end of latch 40 to hold locking lug 39 normally captive in the position shown in FIG. 1. However, when the latch pin 40 is depressed it will be evident that lug 39 together with sector 37 and sheave 18 are free to rotate clockwise about the axis of hinge pin 23.

Normally sector 37 is held locked in a desired adjusted position relative to arm 35 of shaft 20 by means of a threaded shank 50 (FIG. 3). This shank is fixed to arm 35 and protrudes through arcuate slot 38. When a lock nut 51 carried by shank 50 is loosened, sector 37 and pin 23 can be shifted outwardly to disengage teeth 36,36', thereby permitting sector 37 to be rotated through a limited arc relative to teeth 36. This permits detent 39 to be repositioned relative to the latch pin 40 to lock sheave 18 in a desired different stringing plane. When so adjusted lock nut 51 is tightened to lock teeth 36,36' in the new position. As shown in FIG. 1, the parts are locked together to support the sheave in a vertical plane while stringing the conductor. Under other operating conditions it might be desirable that the sheave be supported in a plane inclined to the vertical either to the right or to the left of the position shown in FIG. 1. Once the latch pin 40 is depressed however, the sheave and its supporting shaft 20 are free for rotated counterclockwise pivoting, such as to the position shown in FIG. 1 with the conductor 53 properly positioned for transfer into the seating groove 54 or a suitable clamping device carried at the top of the insulator 14.

CROSS ARM MOUNTING SUB-ASSEMBLY

The cross arm mounting accessory 12 for the sheave will now be described with particular reference to FIGS. 1, 2, 5 and 6. This sub-assembly includes an upper generally cross-shaped casting 55 and a lower channel-shaped clamping member 56.

The arm of plate 55 extending lengthwise of the cross arm is formed with a deep slot 58 opening upwardly and through its opposite ends and having a snug sliding fit with the triangular shaped flat mounting shank 59 projecting from the lower end of the main body 16 of the sheave sub-assembly. The upper rim edges of slot 58 are contoured as is best shown in FIG. 6 and include a horizontal seating surface 60, a left hand seating surface 61 inclined at 45° to the horizontal and a right hand seating surface 62 inclined at 30° to the horizontal. The side walls of slot 58 are provided with three sets of aligned openings 63,64,65 similarly located relative to the associated surfaces 60,61,62 and receptive of a locking pin 66 to lock the sheave sub-assembly seated against any selected set of seating surfaces 60,61,62 and in different angular positions relative to cross arm 13. For example, when the sheave main body is locked assembled in the position shown in FIG. 1, main body 16 lies generally in an upright plane, whereas if it is locked against surface 61 it is inclined at an angle of 45° to the cross arm and if it is locked against surface 62 then it is inclined at an angle of 60° to the cross arm.

The other arm of mounting plate 55 extends crosswise of the cross arm and is provided with shouldered slots 69,70 to seat the headed end of the similar clamping bolts 71,72. The headed ends of these bolts are provided with cross pins 73,74 fixed to the respective bolts and best shown in FIG. 2. The ends of cross pins 73 engage the inclined camming surfaces 75 along either side of slot 69 and which serve to cam bolt 71 against the left hand side of cross arm 13 as viewed in FIG. 2 as these bolts are tightened.

Similar camming surfaces on either side of slot 70 cooperate to form V-shaped notches 76 and cooperate with pin 74 on bolt 72 for a similar purpose as that just described. As will be evident, pin 74 may be located in the trough of the notches or at some position along the side walls of these notches at the start of a tightening operation on the thumb nuts 78 provided for each bolt. If the cross arm is a very narrow one cross pin 74 will be seated in the innermost one of the notches whereas if it is of wider construction then it would be seated in one of the other notches as is appropriate. Any further adjusting action required will be provided by the inclined camming surfaces 75 in notches 69 seating bolt 71.

It is also to be noted from FIG. 2 that each sidewall of slots 69 and 70 is deeply notched at 80 to seat the outer handle end of the locking pin 66 utilized to lock the sheave sub-assembly to the upper clamping plate. Accordingly, whenever this pin is in its assembled position it is held against disassembly by gravity rotation of its shorter leg into the adjacent one of notches 80.

INSULATOR SUPPORTED CLAMPING SUBASSEMBLY

Referring now to FIGS. 7–9, there is shown an alternate mounting sub-assembly 12' for supporting sheave sub-assembly 11 against the side of a rigidly supported insulator 14'. In FIG. 7, the insulator 14' is mounted in an upright position on a cross arm 13', whereas in FIG. 10 it is mounted and supported horizontally on the outer end of a pole supported bracket 13''. Mounting sub-assembly 12' comprises a cast main body 85 having a deep grove 86 shaped to embrace any of a wide range of insulator diameters. Its opposite longitudinal edges are preferably capped with thick elastomeric material 87 which seats against the exterior of the insulator and avoids overstressing or damaging the insulator.

Main body 85 is held rigidly clamped in any desired position lengthwise of the insulator by a wide flexible clamping band 88 preferably heavily coated with elastomeric material 89. The opposite ends of the clamping band are looped and one end seats over an anchor pin 90 and the other end is similarly attached to a pin 92 carried crosswise of the head of bolt 93. The threaded shank 94 of this bolt passes through an opening in one rim edge of main body 85 and supports a semi-cylindrical shaped washer 95 beneath a clamping nut 96. Tightening nut 96 locks the mounting sub-assembly 12' rigidly to the insulator. Preferably, the opening accommodating bolt 93 opens laterally through the edge of the main body as is indicated at 97 in FIG. 9, thereby facilitating the assembly and disassembly of unit 12 to an insulator.

Extending lengthwise of the exterior side of main body 85 is a deep slot 100 (FIG. 8) to receive mounting shank 59 of the main body of the sheave unit. Slot 100 is generally L-shaped and includes a longer leg extending lengthwise of main body 85 and a shorter leg 102 (FIGS. 7, 10) projecting generally radially relative to the clamping band 88. Each of these legs is provided with mounting holes 63',64',65' corresponding to holes 63,64,65 (FIG. 6) in which the assembly pin 66' can be seated to lock shank 59 assembled to its mounting clamp 12'. FIGS. 7 and 10 show but two of the several possible modes of securing sheave sub-assembly 11 to the flexible band-type mounting unit 12'.

While the particular convertible conductor stringing assembly for power line use herein shown and disclosed in detail is fully capable of attaining the objects and providing the advantages hereinbefore stated, it is to be understood that it is merely illustrative of the presently preferred embodiment of the invention, and that no limitations are intended to the details of construction or design herein shown other than as defined in the appended claims.

We claim:

1. A clamping accessory for use in securing a conductor stringing block to a rigidly mounted power line insulator, said accessory comprising a rigid main body having one side thereof formed with a wide deep groove adapted to seat against one lateral side of power line insulators of different diameters, a wide flexible clamping band hingedly connected to said main body adjacent one lateral side of said groove, adjustable clamping means for detachably and rigidly coupling the other end of said band to the other lateral side of said groove, a sheave-equipped stringing block having a support provided with a mounting shank, and means for quickly and rigidly detachably coupling the shank of said stringing block to the main body of said clamping accessory with the sheave of said stringing block disposed along one lateral side of the insulator.

2. A clamping accessory as defined in claim 1 characterized in that said stringing block coupling means includes means for supporting said stringing block selectively in a plurality of different positions relative to the main body of said clamping accessory.

3. A clamping accessory as defined in claim 2 characterized in that said clamping band and the portions of said groove positioned to contact and grip an insulator are equipped with a thick layer of elastomeric material effective to safeguard the insulator against chipping and damage while said accessory is clamped thereto.

4. A clamping accessory as defined in claim 2 characterized in that said stringing block mounting shank has flat opposed faces, said coupling means including slot means having a close sliding fit with the flat faces of said mounting shank, and keeper means for locking said mounting shank rigidly in a selected assembly position in said slot means.

5. A clamping accessory as defined in claim 2 characterized in that the main body of said accessory is provided with an L-shaped slot the sidewalls of which are provided with a plurality of pairs of aligned openings for receiving assembly pin means, said mounting shank seatable in different positions along said L-shaped slot and having an opening registerable with a selected pair of said aligned openings, and assembly pin means for holding said mounting shank of said stringing block firmly coupled to a selected leg of said L-shaped slot.

6. A clamping accessory as defined in claim 5 characterized in that portions of the edges of the sidewalls of said slot are inclined differently with respect to the legs of the slot thereby to cooperate with the shank of said stringing block to support the latter inclined differently relative to the axis of an insulator to which said clamping accessory is assembled.

\* \* \* \* \*